(12) United States Patent
Mettu et al.

(10) Patent No.: US 10,097,637 B2
(45) Date of Patent: Oct. 9, 2018

(54) GRID DISTRIBUTED CACHE

(71) Applicant: Tenoware R&D Limited, Dublin (IE)

(72) Inventors: Pavan K. Mettu, Mountain View, CA (US); Kelly Murphy, Los Altos, CA (US)

(73) Assignee: TENOWARE R&D LIMITED (IE)

( * ) Notice: Subject to any disclaimer, the term of this patent is extended or adjusted under 35 U.S.C. 154(b) by 223 days.

(21) Appl. No.: 14/941,032

(22) Filed: Nov. 13, 2015

(65) Prior Publication Data

US 2016/0142487 A1   May 19, 2016

Related U.S. Application Data

(60) Provisional application No. 62/079,144, filed on Nov. 13, 2014.

(51) Int. Cl.
  *H04L 29/08* (2006.01)
(52) U.S. Cl.
  CPC ................. *H04L 67/1097* (2013.01)
(58) Field of Classification Search
  CPC .................................................. H04L 67/1097
  See application file for complete search history.

(56) References Cited

U.S. PATENT DOCUMENTS

| | | | | |
|---|---|---|---|---|
| 9,317,213 | B1* | 4/2016 | Gupta | G06F 3/064 |
| 9,699,263 | B1* | 7/2017 | Shats | H04L 67/2852 |
| 2016/0028830 | A1* | 1/2016 | Coglitore | H04L 67/2842 |
| | | | | 709/213 |

* cited by examiner

*Primary Examiner* — Abdullahi E Salad
(74) *Attorney, Agent, or Firm* — Steven R. Sponseller; Stevens Law Group

(57) ABSTRACT

Example distributed cache systems and methods are described. In one implementation, a method receives a read call at a first call such that the read call identifies specific data. The method identifies multiple storage nodes and multiple connected clients based on information contained in a cache map. The first client sends the read call to the multiple storage nodes and the multiple connected clients. The method determines whether any of the connected clients has cached the specific data. If at least one of the connected clients has cached the specific data, the specific data is accessed from the connected client that has cached the data. If none of the connected clients has cached the specific data, the specific data is accessed from a storage system.

18 Claims, 6 Drawing Sheets

GRID DISTRIBUTED CACHE

CROSS-REFERENCE TO RELATED APPLICATIONS

This application claims the benefit of U.S. Provisional Application Ser. No. 62/079,144, entitled "Grid Distributed Cache," filed Nov. 13, 2014, the disclosure of which is incorporated herein by reference in its entirety.

TECHNICAL FIELD

The present disclosure relates to distributed cache systems and methods, such as systems that include cache managers that access data from multiple caches.

BACKGROUND

Data processing systems use various techniques to allow multiple devices to access data from different storage systems, such as a cache storage system and a disk-based storage system. Many existing systems associate cache storage systems with a particular device and do not support access of the cache storage system by multiple different devices. This configuration does not result in the best utilization of the cache storage resources. In some cases, a device that does not have data stored in its cache storage system must retrieve the data from a slower disk-based storage system even though a different device may have already cached the same data.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
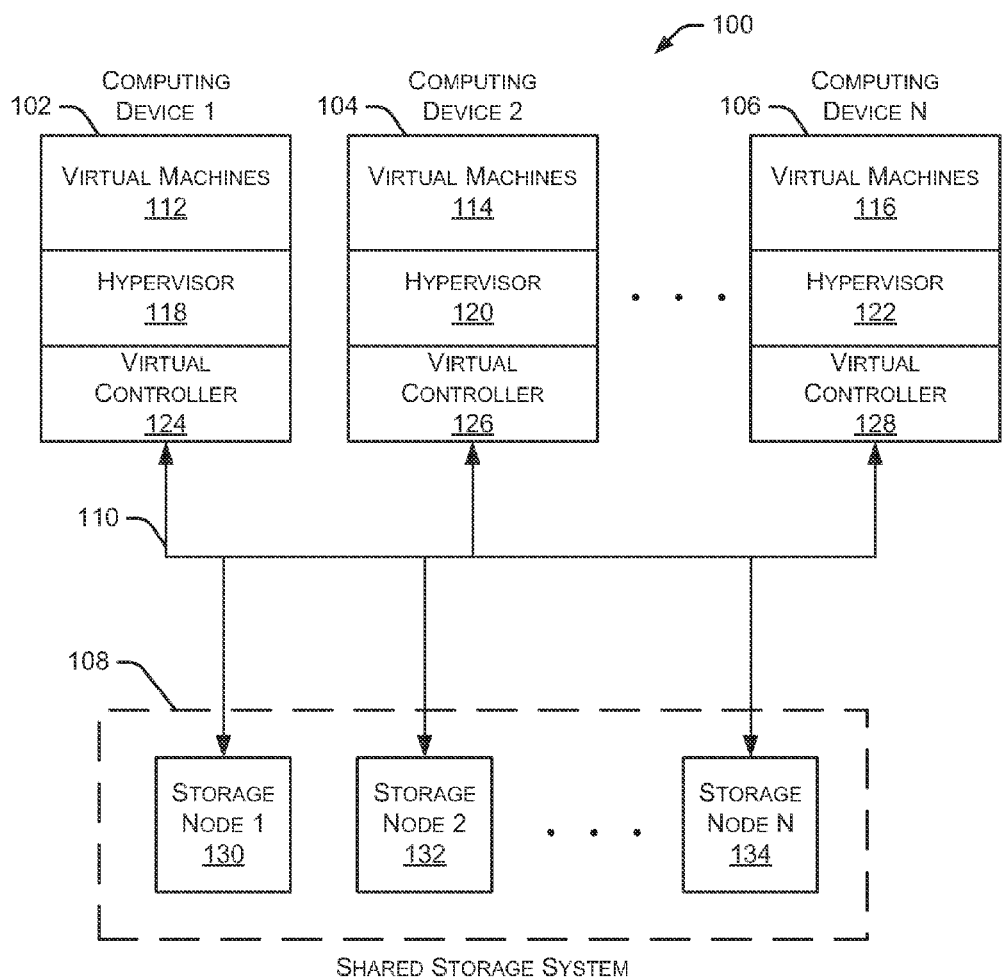
FIG. 1 is a block diagram depicting an embodiment of a data storage and retrieval system including a virtual controller.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein relate to grid distributed caches, including cache managers that can access data from their own client's cache or from clients that are managed by different cache managers. These described systems and methods provide a distributed cache management architecture. This distributed cache management architecture includes a "write behind cache", as discussed in greater detail below.

The described systems and methods operate on both the client(s) and the server(s) which provides an advantage of knowing which system, device, or component is caching particular data and which system, device, or component is overwriting data blocks. In some embodiments, the systems and methods are implemented in layers (i.e., client side and server side) and works globally across all of the nodes. These embodiments allow mobility of VMs (Virtual Machines) anywhere in the hierarchy, so the VMs can move between hosts and still maintain access to their cache information. These embodiments also eliminate the "waterfall effect" in which tiers of caches end up caching everything that is above them even though they will not be called to provide that block of data in the cache (because a different cache above them will have already answered the call). Avoiding this waterfall effect eliminates unnecessary caching of data and provides more efficient cache operation.

In some embodiments, a cache manager maintains information regarding which blocks of data are cached on particular clients (e.g., client devices). In these embodiments, the cache manager maintains a de-centralized cache map that identifies where data is currently cached. This cache map can be used each time data is accessed from any client. In particular implementations, the described systems and methods maintain a connection to other clients that are sharing the same VLUN (virtual logical unit number). This connection can read data from the other clients' caches. For example, if a read call comes in on Client1, it sends a read call to all storage nodes and the connected clients. If the connected client cache contains the data, it will send the data as part of the read response. In some embodiments, a counter is maintained that tracks reads for data in connected client caches. If the number of reads for data in connected client caches exceeds a threshold value, the system will move the cached blocks of data to the node that is reading the data to improve the efficiency of that node's read operations.

All of the storage nodes corroborate that read call by sending the cache manager an indication of what data they have cached, without sending the actual data. The client can read that indication of what data is cached and check with the response from the storage node if it is the correct data. If it is the correct data, the client can read the data from another client. In this situation, the cache map is not updated on the storage nodes. These systems and methods reduce the IO path on the storage nodes.

In the described systems and methods, if the data is cached on any client, the systems and methods do not need to read anything from the disk storage system. Instead, the systems and methods read the map information from the cache data structure and send the map information instead of reading the actual data. This approach allows all calls to be processed in parallel, and data is read from memory (or a faster secondary device, such as Flash) instead of a slower storage system, such as a disk storage system.

In some embodiments, a flag is introduced in the read response indicating that the storage nodes can send the cached client map instead of sending the actual data. In particular implementations, one or more client-to-client operations are provided to support data reads and certain cache management operations. A socket layer connection manager may connect with clients as well as the cache manager.

In some embodiments, the cache manager implements a "write behind cache" on the various storage nodes. The cache manager may read data from a Flash cache and write that data to a disk storage system (or other data storage system), for example by reading the appropriate Flash cache blocks and writing the data to the disk storage system serially.

FIG. 1 is a block diagram depicting an embodiment of a data storage and retrieval system 100 implementing a virtual controller. System 100 includes computing devices 102, 104 and 106. Although three computing devices are shown in FIG. 1, alternate embodiments may include any number of computing devices. Computing devices 102-106 include any type of computing system, including servers, workstations, client systems, and the like. Computing devices 102-106 may also be referred to as "host devices," "host systems," "client devices" or "client systems." Computing devices 102-106 contain a cache manager and at least one Flash cache to store data. Each computing device 102, 104, and 106 includes a group of virtual machines 112, 114, and 116, respectively. Each computing device 102-106 is capable of implementing any number of virtual machines 112-116. In some embodiments, each virtual machine executes an application that may periodically transmit and receive data from a shared storage system 108.

Each computing device 102, 104, and 106 includes a hypervisor 118, 120, and 122, respectively. Each hypervisor 118-122 creates, executes, and manages the operation of one or more virtual machines on the associated computing device. Each computing device 102, 104, and 106 also includes a virtual controller 124, 126, and 128, respectively. As discussed herein, virtual controllers 124-128 manage data read and data write operations associated with the virtual machines 112-116. In particular, virtual controllers 124-128 can handle input/output data (I/O) for each application running on a virtual machine. Since virtual controllers 124-128 understand the type of data (and the data needs) associated with each application, the virtual controllers can accelerate and optimize the I/O for each application. Additionally, since each computing device 102-106 has its own virtual controller 124-128, the number of supported computing devices can be scaled without significant loss of performance.

As shown in FIG. 1, virtual controllers 124-128 manage data read and write operations associated with data stored on shared storage system 108. Virtual controllers 124-128 communicate with shared storage system 108 via a data communication network 110 or other collection of one or more data communication links. Shared storage system 108 contains any number of storage nodes 130, 132, and 134. The storage nodes 130, 132, and 134 are also referred to as "storage devices" or "storage machines." The storage nodes 130, 132, and 134 may be located in a common geographic location or distributed across a variety of different geographic locations and coupled to one another through data communication network 110.

The following discussion provides a low-level description of an example caching system, including: cache tier-ing and communication flow, client side caching design, server side caching design (hint cache), multi-client caching design, a caching algorithm, and a hint generation algorithm. The following discussion is broadly based on the single client caching and multi-client caching. Caching algorithms differ slightly when it comes to single or multi-client caching, but the cache manager is similar on all caching components.

In some embodiments, a cache manager is implemented on a client and/or a server with algorithms designed to guess what data the client wants to read next. The following discussion includes information regarding cache size, the algorithm for generating hints (e.g., guesses), and a variable size cache allocator. The cache size can be multiple different sizes and the variable size cache allocator manages the appropriate size. Instead of having multiple equal sized caches, the variable size cache allocator supports varying cache sizes. The described systems and methods provide an increase in performance and a reduced number of red-modify-writes happening on the clients.

Architectural Strategy

Most of the design is based on existing components and the new components are designed to use the same code for multiple purposes. Common code reduces issues and maintenance time. Current implementation changes are very minimal and a capability to enable and disable this caching module using some parameters. Also, the design is done by keeping in mind the ability to use the same code for hardware-based write behind cache in future.

Architecture

The main components of this design are the client-level cache management which deals with the buffer allocation/free management, block number to offset mapping management, generation of hints of what to do next or what to pass on to the storage nodes. The last one needn't be absolutely perfect but a modest implementation would provide decent results, unless the client is really doing random IOs. The server-level cache also has a similar implementation in terms of cache management, maintaining delegations and an algorithm that generates information on what to do next. The system needs: a cache management solution with LRU and random allocation/free support, an algorithm to generate hints on what are the next blocks that the client might do IO to, delegation handling, and client/host or storage node shutdown/restart scenarios.

QOS Settings

All decisions related to blocks being cached or not is taken by the QoS setting of the VM/Disk. The system already has the intelligence to pass on a QoS level to differentiate priority of a particular IO. Those settings will be followed.

Read Cache Delegations

The system uses a technique wherein the server delegates what kind of caching is done on the client. The server makes a decision on what kind of delegation client gets. There are two types of delegations: EXCLUSIVE_READ_CACHE_DELEGATION and SHARED_READ_CACHE_DELEGATION. The client, as part of connect call, asks for an Exclusive Read Cache Delegation from the storage nodes. Only after it gets a positive response from all the storage nodes, the client sets up its caching algorithms. The client with the local configuration file already knows whether it can do an exclusive or shared caching. But, storage nodes know more about who is accessing them than just checking the configuration file. If the client gets an Exclusive Read Cache delegation, they do the caching. If the client gets a shared delegation, it initializes the data structures accordingly and the server directs it if it can cache a particular write or not in response to the write call.

A client may initially get an Exclusive Read Delegation, but the storage nodes/servers can take back that delegation when another client connects to them and tries to write to the same sub-store as the first client. That client can either re-initialize that cache or send a cache map which it has. Once that is done, the client's delegation becomes a Shared Read Cache Delegation. If the client doesn't respond to the delegation recall from the storage nodes, the storage nodes will kill the connections from that client. The client will re-initialize the cache in these cases. A client can ignore a delegation recall if it is already in the shared mode but should respond to the storage nodes.

Design of Cache Management on Client

Cache management on a client is organized in such a way that it works irrespective of where the cache is located—either in main memory or a secondary memory flash device. The system uses the same algorithm at a later time to do write back caching if it ever wants to. The client-side cache management works in two modes: Exclusive Read Cache delegation mode or in Shared Read Cache delegation mode. Data structures remain the same in both cases except some of the variables that deal with how to allocate cache and clean cache. Discussed below in one section is information about how to use this cache in Exclusive Read Cache delegation mode and another section is about Shared Read Cache Delegation mode.

Client Cache Management is done by allocating a chunk of sequential memory buffer with a cache header followed by individual cluster cache chunks. Each cluster cache chunk also has a header that has further details about the cache stored. There is a bit map in the cache header that tells whether a particular block is cached or not. The system stores a particular cluster only if it has a quorum amount of stripe information. There are three operations that can be done with the Cache Header: Store, Access and Delete. There is a tree map that maintains the mapping of block number to the offset in the cache.

In the storing process, the system checks to determine if there is a quorum amount of stripes and then asks the allocator to provide the location in the cache. The allocator does different functions based on the type of delegation. In the Exclusive mode, it follows the LRU method and behaves like a circular buffer. In the Shared mode, it will have to find the block offset where it can be stored and returns the offset. Once the allocator provides the mapping, the system stores that mapping in the tree for that block and then marks the bit in the Cache header.

In the access process, the system takes the block number and finds out if it exists in the cache by checking the bit. If the system finds it, the system asks the hash table about the offset and accesses the cache from the cluster cache header.

In the delete process, based on the delegation mode, the system masks bits which are set and clears up the avl tree and adjusts the first pointer in the cache header. Although particular embodiments discuss an avl tree, alternate embodiments may use any type of tree data structure.

Cache Header

Figure 2:
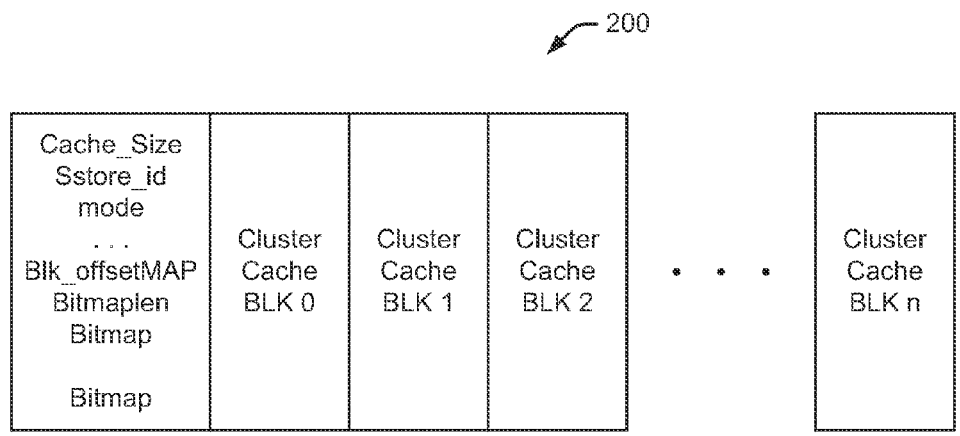
FIG. 2 is a block diagram depicting an embodiment of a cache header.

FIG. 2 is a block diagram depicting an embodiment of a cache header 200. In addition to the information shown in FIG. 2, an example cache header includes:

---
Cluster Header
---
```
typedef struct gs_clcache_hdr {
char     magic[MAGIC_SIZE];
gs_mutex_t   cmutex;
uint64_t    cache_size;
guid_t    vstore_id;
guid_t    substore_id;
uint64_t    starting_blk_no;
bool_t    valid;
bool_t    delegation_mode;
uint16_t    record_size; /* Cluster Size + Cluster Header size */
offset_t    first_block;
offset_t    last_block;
uint64_t    no_of_blocks; /* for calculating current cache size */
avl_tree_t block_offset_map;
...
uint64_t    bitmap_len;
char     *bitmap;
} gs_clcache_hdr_t;
```
---

Figure 3:
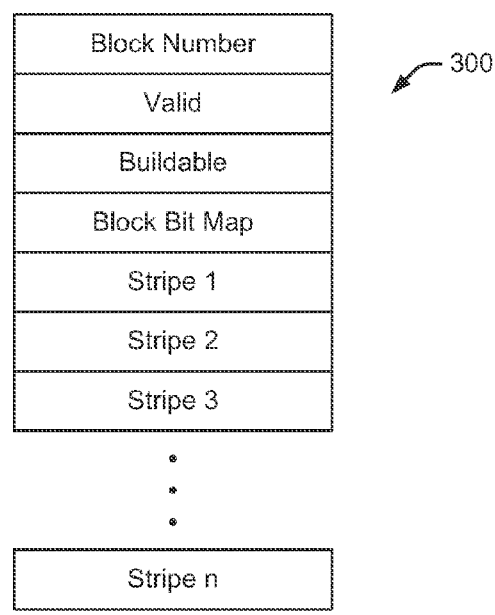
FIG. 3 is a block diagram depicting an embodiment of a cluster header.

FIG. 3 is a block diagram depicting an embodiment of a cluster header 300. In addition to the information shown in FIG. 3, an example cluster header includes:

---
```
typedef struct gs_cache_cluster_rec_hdr {
char     magic[MAGIC_SIZE];
uint64_t    blkno;
bool_t    valid;
bool_t    buildable;
uint8_t    blkmap;
char     *stripes;
} gs_cache_cluster_rec_hdr_t;
Operations related to Client Cache
gs_cache_hdr_t *gs_cache_vstore_init(vstoreid, delegation_mode);
offset_t gs_cache_alloc(gs_cache_hdr_t *handle, delegation_mode, blkno);
bool_t gs_cache_dealloc(gs_cache_hdr_t *handle, blkno);
bool_t gs_cache_mode_upgrade(gs_cache_hdr_t *handle, delegation_mode);
bool_t gs_cache_add_map(gs_cache_hdr_t *handle, delegation_mode, blkno, offset);
bool_t gs_cache_del_map(gs_cache_hdr_t *handle, delegation_mode, blkno, offset);
bool_t gs_cache_add_bitmap(gs_cache_hdr_t *handle, blkno);
bool_t gs_cache_del_bitmap(gs_cache_hdr_t *handle, blkno);
void gs_cache_vstore_deinit(vstoreid);
```
---

The system includes an infrastructure for maintaining an AVL tree (or other type of tree data structure). For the mapping of block number to offset, the system uses that infrastructure.

Allocator

The allocator's role is to provide an offset for the cluster to be stored in the cache. In an Exclusive delegation mode, it works in a simple way, by serially looking for the last offset pointer and adding the offset in the mapping tree. In Shared delegation mode, the allocator needs to find out from the bit map where the data can be fitted in and lock the offset. It's a little more complicated than the Exclusive mode but in this case the system uses a complimentary cache to the CSV Cache which is already present.

Delete Cluster(s)

Deleting of cache clusters can be done in the exclusive delegation mode when the system reaches the end of cache buffer. The system can mask/unmask bits in the bitmap at that time and mark the validity of the cluster as invalid. The system needs to remove the mapping at the same time in the mapping table. First and last pointers will be updated based on delegation type. In Shared Delegation mode, the system doesn't make use of the first and last offset pointers. The system finds the bits and masks/unmasks them, removes the mapping and then sets the cluster cache record invalid bit.

Delegation Recall (Upgrade Mode)

The system can get a oob (out of band) message from the server if another client starts accessing the data on the storage nodes. In that case, the system will need to upgrade the mode from Exclusive to Shared. Already cached blocks will remain but the mode changes and so the allocator fetches. The allocator can still use the LRU until it reaches the end of cache. Once it reaches the end, it can change the algorithm to Shared delegation mode. If the system doesn't get the delegation recall message from the client, it performs the following process.

Delegation Recall—Cache Rebuild

When a delegation is re-called, downgrading an Exclusive Read Cache delegation to Shared Read Cache delegation, the client can keep its cache intact and send the cached blocks to each storage node. The storage node, before granting the shared delegation to the new client, builds the shared cache that is cached by client1 from whom it recalled the delegation. The client always has the full data, so it just sends the bit map to the storage nodes along with a MD5 hash of that bit map and nodeid int and guid. The storage node, once it receives data, acknowledges first and then builds its own cache data structures. The mapping tells the storage node with whom the data is stored.

Hint Thread

The system maintains a rolling array of last read block numbers either from the cache or from storage nodes. A thread is continuously running which is going through that list and deciding either to do any pre-fetches or send any hints to the storage nodes.

Design of Cache Management on Server

The cache on a server is mainly the read ahead cache that can help the system to read directly from the cache for read-modify-writes or for reads. It's a fully complimentary cache working in sync with the client cache. The main premise is that the system is not going to cache the same thing on the client and the server. The server cache algorithm is mainly used for guessing and caching what the client wants to do next. The server cache management is not organized in a sequential way. It is similar to the client side when in Shared Delegation mode. The server maintains and tracks what blocks are cached on what client and a block can be cached on only one client. The following design is an example of how a client caches its data.

```
typedef struct gs_srvcache_hdr {
char       magic[MAGIC_SIZE];
gs_mutex_t    smutex;
uint64_t     cache size;
guid_t      substore_id;
bool_t      valid;
bool_t      delegation_mode;
client_info_t *clinfo; /* Client Delegations */
uint16_t     blk_size;
uint64_t     no_of_blocks; /*for calculating cache sz */
avl_tree_t blk_cached_map; /*Blocks Cached on clients */
...
uint64_t     bitmap_len;
char       *bitmap;
} gs_srvcache_hdr_t;
typedef struct client_info_s {
uint16_t   client_id;
int              delegation_mode;
struct client_info_s *next;
} client_info_t;
```

Blk records follow the above header and are organized as shown in the example below.

```
typedef struct gs_srvblk_hdr {
char    magic[MAGIC_SIZE];
bool_t  valid;
uint16_t  blkno;
char    *blkbuf;
} gs_srvblk_hdr_t;
```

Figure 4:
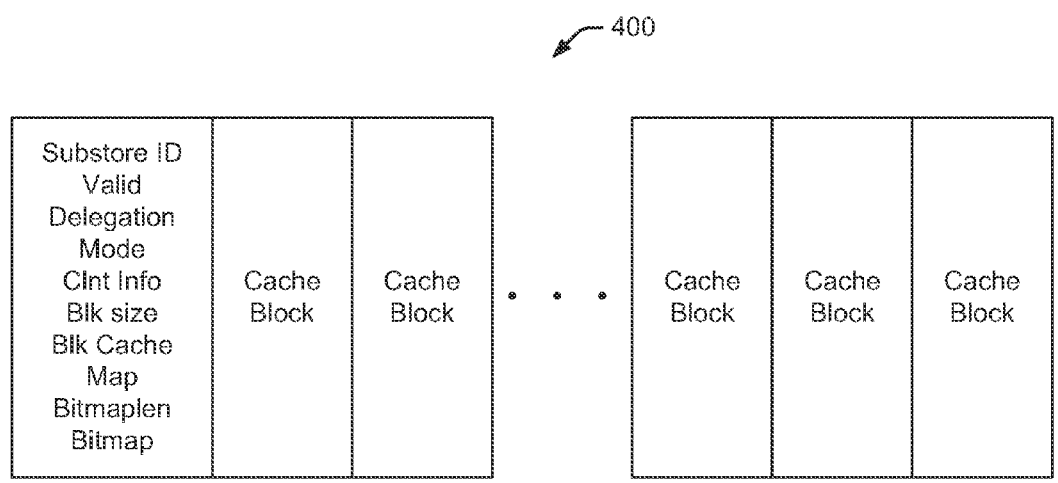
FIG. 4 is a block diagram depicting an embodiment of a block cache header.

FIG. 4 is a block diagram depicting an embodiment of a block cache header 400.

The cache on the server is organized with the main header SrvCachehdr followed by multiple blocks of cache with each block cache having its own header. The server-side cache map structure tells whether the cache is in the client or locally and if it's on the client, identifies which client has that information. Allocation of space in the block cache is same as the client-side algorithm. The hint cache algorithm runs here based on what the system is caching on the client from the rolling cache blocks maintained after responding to the clients on what they can cache.

Invalidation of Cached Blocks on Clients

In a shared delegation mode, two clients can access a block at the same time. Anytime the system hits a block that is cached by one client and the other client does any IO to that block, the system will clear up a few blocks of cache from the client around that block depending on the cluster size and block sizes on the storage and client. Over time, the system can build up an algorithm that can track the blocks that are commonly shared between the two clients and never cache those blocks on any of the clients, and instead cache them on the storage node.

In an exclusive cache delegation mode, the server need not maintain the blocks cached by clients. Initially, the system will maintain them but later it can take them out if the system has a good hint algorithm. Any client that asks for delegation will be checked in the client information structure and given the delegation based on what the server has.

Most of the server-side code is part of the client code related to cache management. There is no special code other than the multi-client cache management of sending an oob message to the client that cached blocks that are accessed by another client. If a second client does any IO to a block that is cached by a first client, the server sends a oob message to the first client and makes sure that block and surrounding blocks on that client are freed up before returning success for the write call. At that time, it will not send that second client to cache that block on the client but add that block to the local cache at the same time.

Cache Management—Client/Server Reboot/Restart

Client Reboot/Restart

When a client goes down for some reason holding exclusive cache delegation, the storage node doesn't need to do anything related to cache other than just clearing up the delegation related data structures. When the client goes down holding a shared cache delegation, based on the node-id, it has to go through the mapping table and delete the entries related to that client. The storage node has to go through all the mapping entries and check for this client and delete them. This can slow down the storage node a little bit or keep at the current no-cache performance level.

Storage Node Reboot/Server Restart

When the storage node goes down and comes up, if the client has an exclusive read cache, the storage node doesn't need to do anything other than setting up its own data structures. The client, upon recognizing the restart of the server, will ask for delegation again. If it gets the exclusive delegation again, it just continues as if nothing happened. If the storage node doesn't come up, the client can still keep serving data off its cache. Once the connection is established at a later point of time, it will send its cache map to the storage node that builds its own mapping.

In the case of clients holding shared write cache, once the storage node comes up, the client sends a cache map to the storage node and starts building the map for each client. Until the storage node builds up the mapping cache, all the storage nodes will tell clients not to cache any new data until the storage node is done building. In the meantime, invalidating of cache blocks can happen if clients are writing to blocks cached by others. It is similar to a pause mode for the clients. This operation also slows down storage nodes or keep the performance at the current no-cache levels until the re-building process is done.

Figure 5:
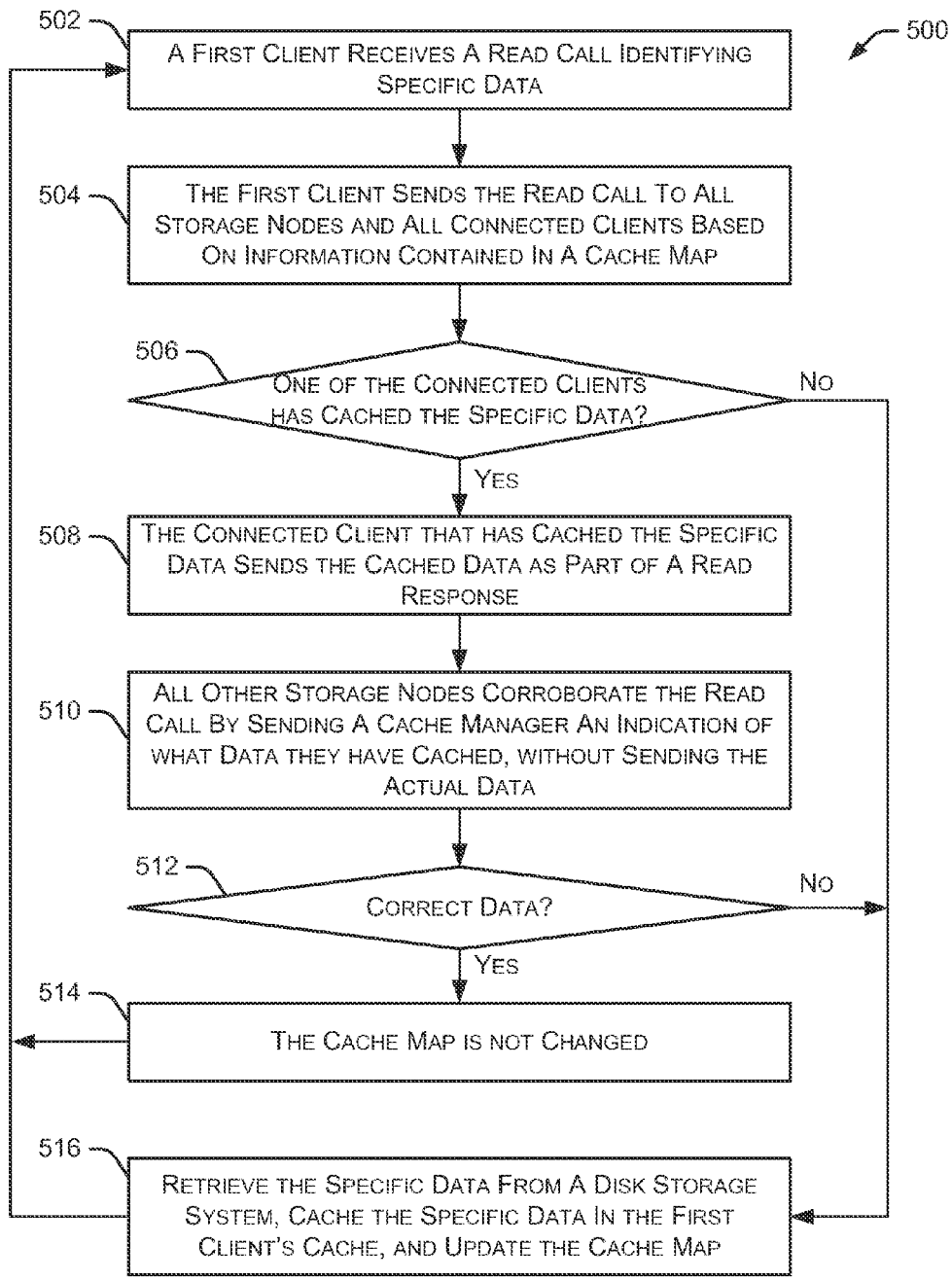
FIG. 5 is a flow diagram depicting an example embodiment of a process for managing cache data and read calls.

FIG. 5 is a flow diagram depicting an example embodiment of a process 500 for managing cache data and read calls. In some embodiments, a client sends a request to all distributed caches hosted by all clients and servers. If a client has the requested data, it sends the data and the storage nodes corroborate that data by sending metadata associated with the requested data.

Initially, a first client receives a read call identifying specific data at 502. The first client sends the read call to all storage nodes and all connected clients based on information contained in a cache map at 504. Process 500 then determines whether one of the connected clients has cached the specific data at 506. If none of the connected clients has cached the specific date, the specific data is retrieved from a disk storage system (or other type of storage system) and cached in the first client's cache, and the cache map is updated at 516. If at least one of the connected clients has cached the specific data at 506, the connected client that has cached the specific data sends the cached data as part of a read response at 508. All other storage nodes corroborate the read call at 510 by sending a cache manager an indication of what data they have cached without sending the actual data. If the data in the cache map is correct at 512, the cache map is not changed at 514 and the process returns to 502 to await the next read call. If the cache map does not have correct data at 512, the process retrieves the specific data from a disk storage system (or other type of storage system) and caches the specific data in the first client's cache, and the cache map is updated at 516.

Figure 6:
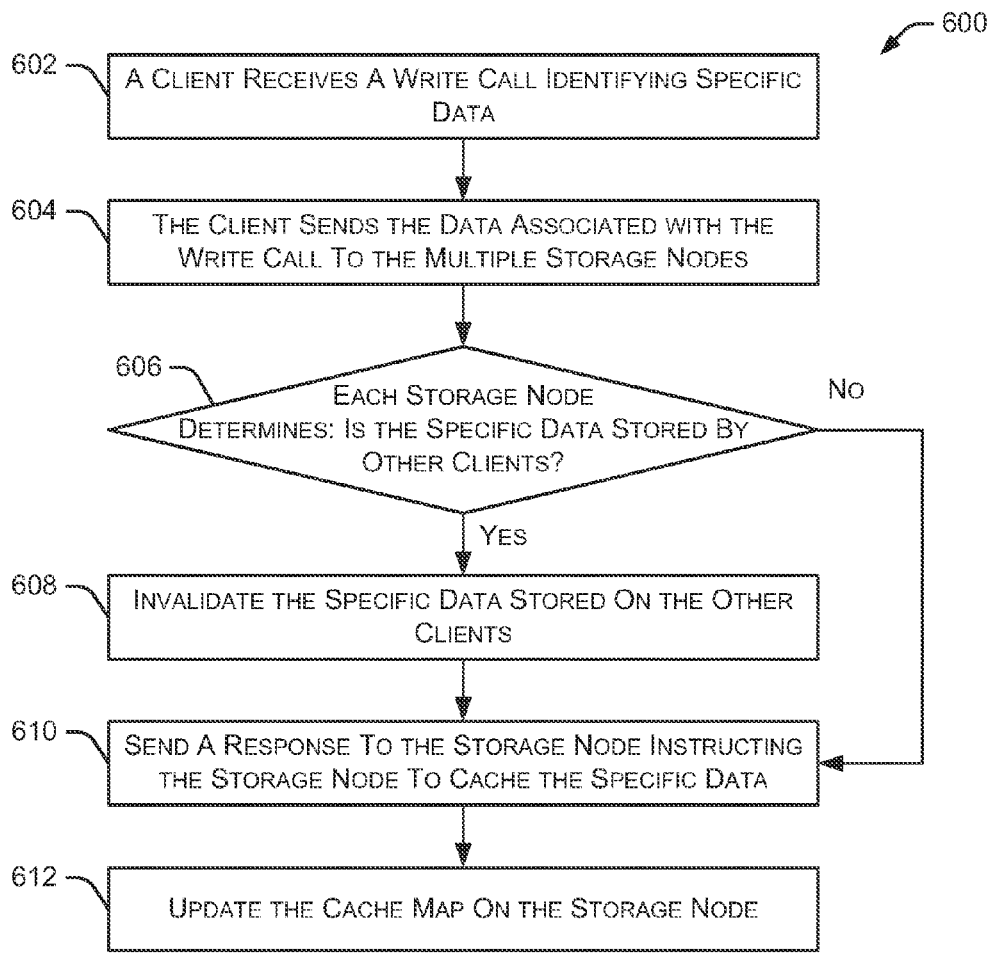
FIG. 6 is a flow diagram depicting an example embodiment of a process for managing write calls.

FIG. 6 is a flow diagram depicting an example embodiment of a process 600 for managing write calls. Additional details and example embodiments of the distributed cache manager systems and methods are described herein. Initially, a client receives a write call identifying specific data at 602. The client sends the data associated with the write call to the multiple storage nodes at 604. The process determines at 606, for each storage node, whether the specific data is stored by other clients. If not, the process sends a response to the storage node instructing the storage node to cache the specific data at 610. If the specific data is stored by other clients, the process invalidates the specific data stored on the other clients at 612 and sends a response to the storage node instructing the storage node to cache the specific data at 610. The process continues by updating the cache map on the storage node at 612.

In some embodiments, as part of write calls, a client/host sends a write request to the storage nodes. All of the write calls are tagged with information on the QoS level at which it is. Based on the QoS level, a storage node checks to determine if those data blocks are already cached by any other clients. Before the storage nodes complete the Write Operation, an invalidate request for those same blocks are sent to the client which cached that data. That client then invalidates those data blocks from the cache and responds to the storage nodes. Once that is done, the client responds to the original write request with a flag indicating if that block can be cached or not. If those blocks are not cached, the storage node sends the write response with a flag indicating whether the client/host can cache it or not.

A data block from a VM/OS can be cached or not depends on these factors:

1. QoS Level (GS VM Settings)
2. Client Status (busy, CPU full, etc.)
3. Same data blocks are written/accessed from different clients/hosts.
4. Storage node status (busy, cannot track for some reason).
5. Client support (no Flash or Cache support).

Cache Delegations

As soon as the client/host process starts up, it checks itself to see if there is GridCache support. A management process looks through the configuration and sets up that information for the client to pick up. Once the client has that information, it sends a request for exclusive caching of data to storage nodes. The storage nodes know if there is any other client connected to them and, depending on that condition, decides to give a client Exclusive caching delegation or not. If the Client/Host gets an exclusive delegation (which means that there are no other clients sharing the same disk), it can cache depending on the above five rules and the storage nodes don't maintain any metadata about the cache map. The storage nodes can break the exclusive delegation at any time when another client connects to the same disk and starts maintaining the cache map. If the Client/Host gets a Shared delegation, the client knows that there is one more client sharing the disk (e.g., Windows CSV disk).

Figure 7:
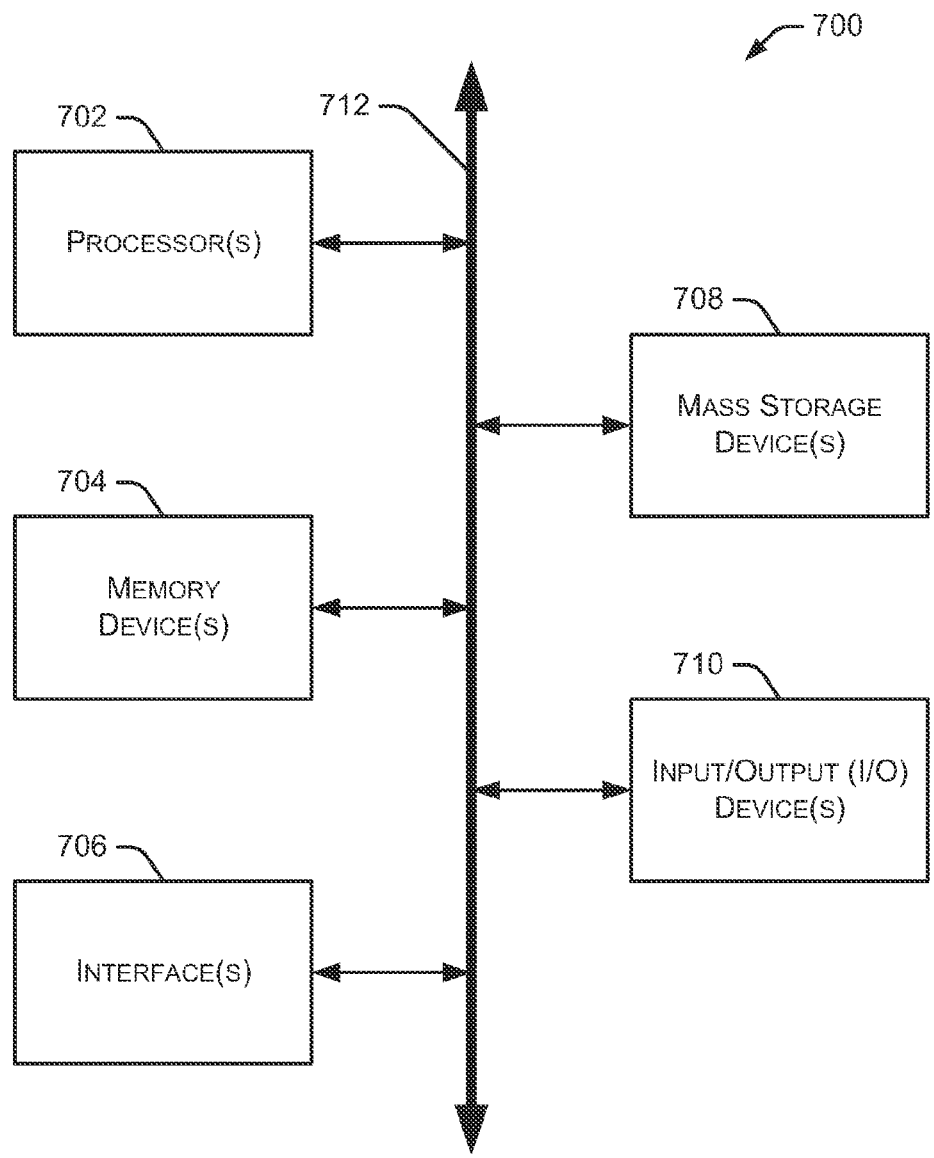
FIG. 7 is a block diagram depicting an example computing device.

FIG. 7 is a block diagram depicting an example computing device 700. Computing device 700 may be used to perform various procedures, such as those discussed herein. Computing device 700 can function as a server, a client or any other computing entity. Computing device 700 can be any of a wide variety of computing devices, such as a desktop computer, a notebook computer, a server computer, a handheld computer, a tablet, and the like. In some embodiments, computing device 700 represents any of computing devices 102, 104, and 106 discussed herein.

Computing device 700 includes one or more processor(s) 702, one or more memory device(s) 704, one or more interface(s) 706, one or more mass storage device(s) 708, and one or more Input/Output (I/O) device(s) 710, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) and/or nonvolatile memory (e.g., read-only memory (ROM)). Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. Various drives may also be included in mass storage device(s) 708 to enable reading from and/or writing to the various computer readable media. Mass storage device(s) 708 include removable media and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Interface(s) 706 include various interfaces that allow computing device 700 to interact with other systems, devices, or computing environments. Example interface(s) 706 include any number of different network interfaces, such as interfaces to local area networks (LANs), wide area networks (WANs), wireless networks, and the Internet.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
    receiving a read call, at a first client, wherein the read call identifies specific data;
    identifying a plurality of storage nodes and a plurality of connected clients based on information contained in a cache map, wherein the first client and the plurality of connected clients each comprise a cache storage node and a client computing device capable of implementing a virtual machine;
    sending, by the first client, the read call to the plurality of storage nodes and the plurality of connected clients;
    determining, using one or more processors, whether one of the connected clients has cached the specific data;
    responsive to determining that one of the connected clients has cached the specific data, accessing the specific data from the connected client with the cached specific data; and
    responsive to determining that none of the connected clients has cached the specific data, accessing the specific data from a storage system, storing the specific data in the cache storage node of the first client, and updating the cache map to indicate that the specific data is stored in the cache storage node of the first client.

2. The method of claim 1, further comprising receiving a plurality of read responses from the plurality of connected clients.

3. The method of claim 2, wherein determining whether one of the connected clients has cached the specific data is based on the plurality of read responses.

4. The method of claim 2, wherein a connected client that has cached the specific data communicates the specific data to the first client in the read response.

5. The method of claim 1, further responsive to determining that none of the connected clients has cached the specific data:
    caching the specific data accessed from the disk storage system in a cache associated with the first client; and
    updating a cache map associated with the first client, the plurality of connected clients, and the plurality of storage nodes.

6. The method of claim 1, wherein data cached on a particular client is invalidated if another client to the storage nodes writes the same data block.

7. The method of claim 1, wherein the storage system is a disk storage system.

8. The method of claim 1, wherein determining whether one of the connected clients has cached the specific data includes determining whether at least one of the connected clients has cached the specific data in a flash cache.

9. The method of claim 1, wherein a cache manager determines whether a particular connected client has cached the specific data.

10. An apparatus comprising:
    a memory; and
    one or more processors coupled to the memory, the one or more processors configured to:
        receive a read call, at a first client, that identifies specific data;
        identify a plurality of storage nodes and a plurality of connected clients based on information contained in a cache map, wherein the first client and the plurality of connected clients each comprise a cache storage node and a client computing device capable of implementing a virtual machine;
        send the read call to the plurality of storage nodes and the plurality of connected clients;
        determine whether one of the connected clients has cached the specific data;
        responsive to determining that one of the connected clients has cached the specific data, access the specific data from the connected client with the cached specific data; and
        responsive to determining that none of the connected clients has cached the specific data, access the specific data from a storage system, storing the specific data in the cache storage node of the first client, and updating the cache map to indicate that the specific data is stored in the cache storage node of the first client.

11. The apparatus of claim 10, wherein the one or more processors are further configured to receive a plurality of read responses from the plurality of connected clients.

12. The apparatus of claim 11, wherein the one or more processors determine whether one of the connected clients has cached the specific data is based on the plurality of read responses.

13. The apparatus of claim 11, wherein a connected client that has cached the specific data is configured to communicate the specific data to the first client in the read response.

14. The apparatus of claim 10, wherein the one or more processors are further configured, responsive to determining that none of the connected clients has cached the specific data, to:
    cache the specific data accessed from the disk storage system in a cache associated with the first client; and
    update a cache map associated with the first client, the plurality of connected clients, and the plurality of storage nodes.

15. The apparatus of claim 10, wherein the one or more processors are further configured to invalidate data cached on a particular client if another client writes the same data block.

16. The apparatus of claim 10, wherein the storage system is a disk storage system.

17. The apparatus of claim 10, wherein determining whether one of the connected clients has cached the specific data includes the one or more processors determining whether at least one of the connected clients has cached the specific data in a flash cache.

18. The apparatus of claim 10, wherein a cache manager determines whether a particular connected client has cached the specific data.

* * * * *